Patented Oct. 28, 1924.

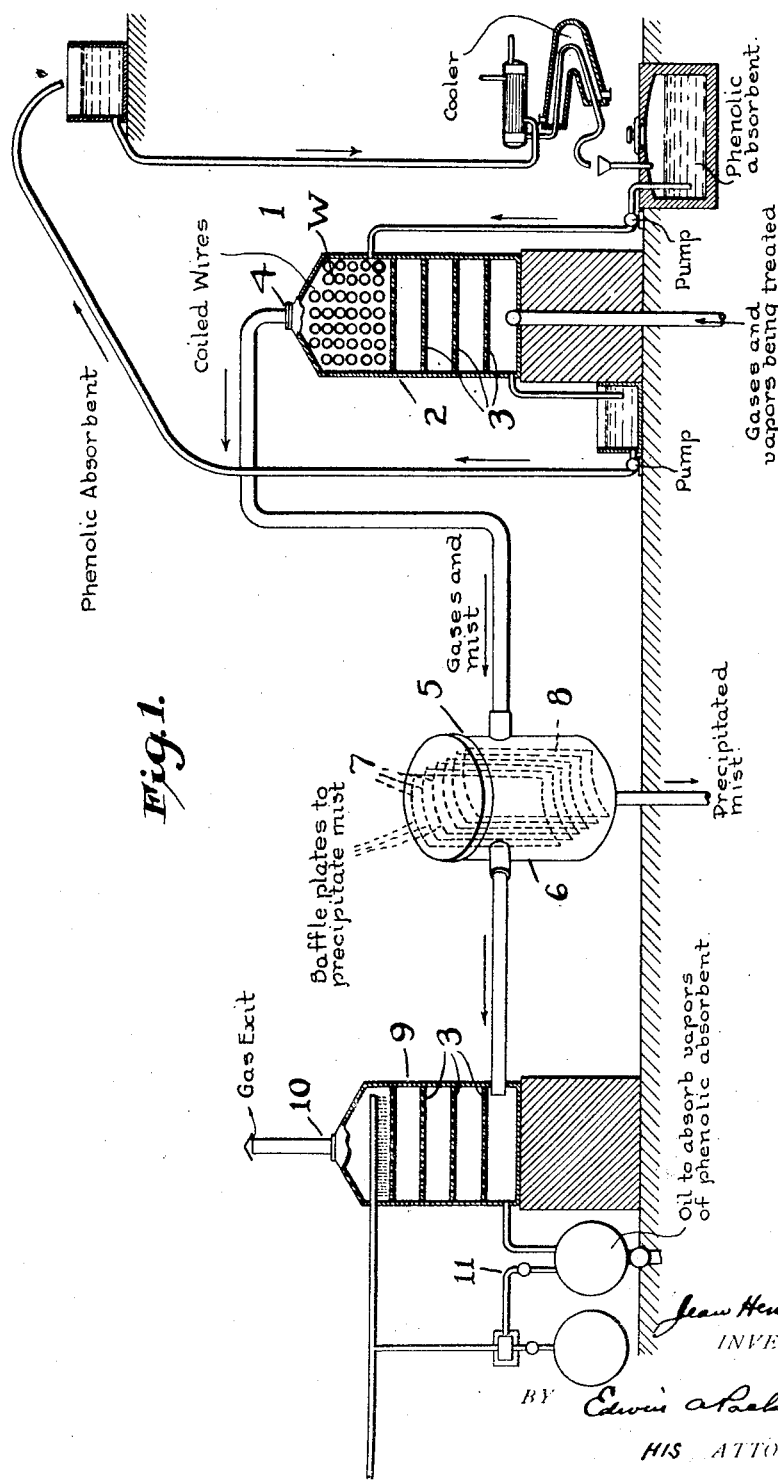

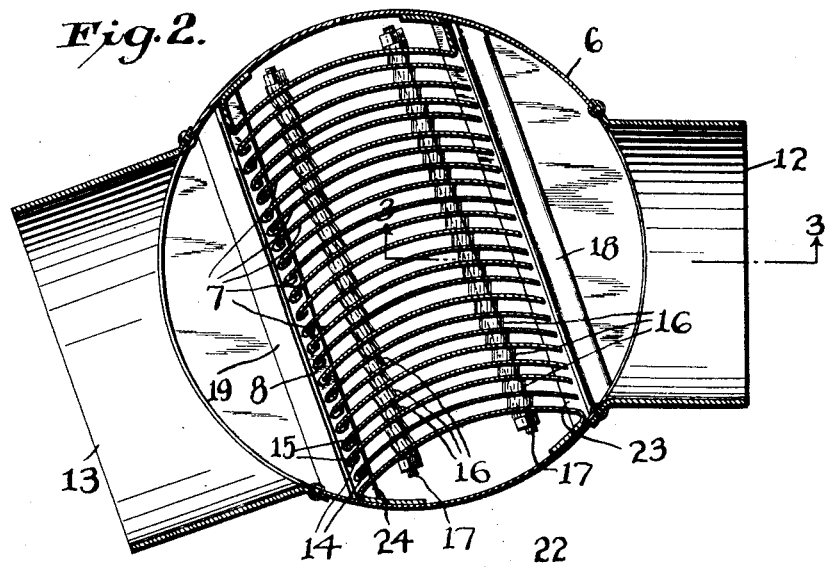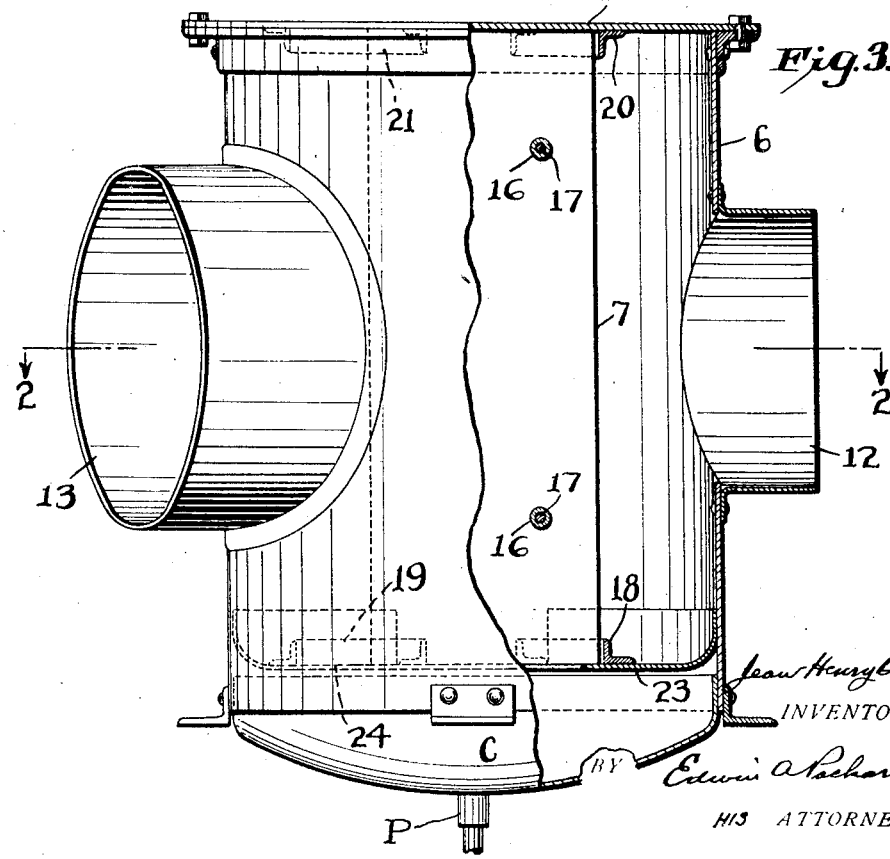

1,513,152

UNITED STATES PATENT OFFICE.

JEAN HENRY BRÉGEAT, OF PARIS, FRANCE, ASSIGNOR TO BREGEAT CORPORATION OF AMERICA, OF WILMINGTON, DELAWARE, A CORPORATION OF DELAWARE.

REMOVAL OF PHENOLS IN SOLVENT-RECOVERY PROCESS.

Application filed September 19, 1921. Serial No. 499,773.

*To all whom it may concern:*

Be it known that I, JEAN HENRY BRÉGEAT, a citizen of the French Republic, and a resident of Paris, Department of the Seine, France, have made certain new and useful Improvements Relating to the Removal of Phenols in Solvent-Recovery Processes, of which the following is a specification.

In United States Letters Patent No. 1,315,700 and No. 1,315,701 dated September 9, 1919, there is described, respectively a process and an apparatus for the recovery of volatile solvents, relating to inventions (of mine) and according to which phenols (including cresol) are used, alone or mixed with other products or reagents, for the recovery of volatile solvents otherwise lost in the course of manufacture of products in which such solvents are used. Said patents set forth that "as examples of phenolic agents may be mentioned crude carbolic acid, the residue from the distillation of mixtures of phenol and the cresols, and especially cresols of commerce."

If the process described in said patents is properly performed, practically all of each volatile solvent can be extracted from the atmosphere or other gaseous medium with which the volatile solvent—in vapor form—is mixed or entrained when treated by the absorbent, to wit, the crude cresol of commerce. In performing the process of said patents said mixture of air and volatile solvents enters an absorption device—a first absorption device—as at the bottom of an absorption column and flows upwardly counter to said downwardly flowing absorbing agents. Crude cresol may be used as the absorbent. The air passes out at the top of the absorption column. As pointed out in the patents mentioned, the down flowing cresol absorbs the vapors of the volatile solvents from the air. However, in carrying out the process of said patents there is some loss of the absorbent used for the recovery of the volatile solvents from the gaseous medium with which the volatile solvents are mixed or entrained, and from which the volatile solvent vapors are to be removed. This loss is, however, in most cases not very great. The main loss of the phenols (e. g., the crude cresol,) is from the air exit of this absorption column wherein the cresol is employed to absorb the vapors or volatile solvents from the atmosphere. This loss can or may rise from some of the cresol in the form of mist or droplets being swept out or carried off by or in the air travelling counter to the cresol, and also by some of the cresol being vaporized, and the vapors being carried away mixed with the air.

The present invention embraces the initial employment of a mechanical separator whereby the mist or droplets of cresol are preferably first mechanically separated from the air flowing through the system and a subsequently passage of the air with cresol vapors entrained (which air and cresol vapors may be considered a new gaseous mixture) through a second absorption device wherein a second absorbent is employed to take from the air or new mixture, the vapors of the first absorbent to wit:—cresol.

The present invention, according to one aspect thereof, includes mechanical separation from the air of cresol droplets or mist followed by the absorption of the cresol vapors.

As illustrating an apparatus in which the process may be conducted, reference is made to the accompanying drawings, forming a part of this specification, and in which drawings:—

Figure 1 illustrates, somewhat diagrammatically, an absorption column and some associated parts, of the Brégeat system combined with a mechanical cresol separator, and a second absorption device by which vapors of cresol are removed from the air coming from the first absorption device.

Figure 2 is a horizontal sectional view of a mechanical cresol separator which may be included in the arrangement of Figure 1; this figure being a view taken as on the plane indicated by line 2—2 of Figure 3 looking in the direction of the arrows; and Figure 3 is a vertical view, part elevation, part section, of the mechanical cresol separator shown in Figure 2; the portion of Figure 3 which is shown in section is taken as on the plane indicated by the line 3—3 of Figure 2 looking in the direction of the arrows.

Reference will now be made to the drawings in detail:—

The reference character 1 designates (as a whole) an assemblage of a part of the system of the patents above identified. This assemblage of members comprises an absorption column, 2, with trays, 3, (as shown and described in Patent No. 1,315,700, for example). The air or gaseous medium after treatment by the crude cresol for the removal of the vapors of the volatile solvents leaves the absorption device at 4, (as indicated in the Brégeat patents mentioned). This air leaving the absorption device has entrained or mixed therewith cresol—partly in the form of droplets or mist and partly in vapor form—resulting from the counter current contact travel of the air carrying the volatile solvent vapors, and the cresol solution. The air leaves the absorption column at its top as at 4, then passes through a device as 5 referred to herein as a mechanical cresol separator, the function of which is to eliminate mechanically any droplets or mist of cresol carried in the same air. There will remain in the air substantially only that cresol which is in the form of vapor.

The cresol separator shown consists of a closed receptacle or casing 6 in which there is located a series of baffle plates 7 against which the air coming from the absorption column impinges in such a way as to remove the droplets of cresol. The baffle plates 7 are arranged to constitute a set collectively designated as 8. The specific construction of the plates and the manner of supporting the same within the closed receptacle will hereinafter be described more in detail. The mechanical cresol separator 5, comprises a casing 6, closed except for the inlet and outlet openings 12 and 13 respectively. The pipe members 12 and 13 extend at an angle to each other as seen in Figure 2, and may be respectively referred to as inlet pipe and outlet pipe. Each baffle plate 7 is in vertical position and has a rectangular projection but in horizontal cross section it is arc-shaped. The rear vertical edge portion (the discharge edge portion) of each baffle plate is bent backwardly as at 14 thus providing a vertically extending trough portion as at 15. The baffle plates 7 are arranged, in effect, in parallel relationship in respect to each other as is manifest from Figure 2. They are spaced apart and secured together into a single set, by space members and rods as 16 and 17 respectively. The set of baffle plates rests upon horizontally (and in effect transversally) extending, supporting angle members 18 and 19 and is secured at the top by angle members 20 and 21. The baffle plates 7 extend to the top or cover 22, of the closed receptacle. The lower end of the baffle plates extend to a drain chamber designated by "C" and the space or spaces between the assembled baffle plates 7 is or are in direct connection with the drain chamber "C". Liquid cresol collects within this drain chamber "C" and is withdrawn from the latter as through pipe "P". A separator plate 23 extends from the vertical wall of the closed receptacle to the supporting angle 18 and a similar separator plate 24 extends from the vertical wall of the closed receptacle to the supporting angle 19. The plates 18 and 19 become in effect ceiling or roof members for the drain chamber "C". The inlet pipe 12 is small as compared to the outlet pipe 13 in order that they may effect a fast inflow and slow outflow. The center line of the inlet pipe 12 is in effect tangent or parallel nearest to the edge portions of the baffle plates 12, in order to provide a smooth inflow to the spaces between the baffle plates. The center line of the offtake pipe 13 is at a considerable angle to the direction of the end portion of the baffle plates.

From what has preceded it will be manifest that the incoming mixture of air with cresol vapors entrained therein enters the space or spaces defined by the several baffle plates, and is subdivided into streams. The cresol mist or droplets tend to move in a straight path and are driven against the inner surface of the arc-shaped baffle plates and toward the vertically extending trough portions 15 from which the collected cresol can flow downwardly into the drain chamber "C". The air freed of the cresol mist or droplets then travels in a relatively straight path to and through the exit pipe 13 on its way to the second absorption device 9 wherein the cresol vapors are removed from the air.

The mixture of air and cresol vapors enters a second absorption device, to wit:—the auxiliary absorption column 9 at the bottom and flows upwardly therethrough in intimate contact with downwardly or counter flowing peanut oil or other suitable absorbent liquid and under conditions whereby the absorbent liquid effects a removal or absorption of the cresol vapors, thus substantially ridding the air of said cresol vapors. This column may also have perforated trays 3. Finally, the air substantially freed from cresol (both mist and vapors) leaves from the top of the auxiliary absorption column 9 at 10. A circulating system as 11 may circulate the absorbent (to wit:—whatever vegetable oil or other suitable absorbent liquid employed in the second absorption column 9).

In regard to the quantity of cresol vapors which can become entrained or mixed with the air or gaseous medium while in the absorption column 2 or first absorption means, it will be noted that cresol has a vapor pressure of approximately 0.12 m. m. of mercury at 20 degrees C. This corresponds to an entrainment of cresol, per cubic meter of air, at 20° C., as approximately 0.7 gram. Some cresol in addition, may be mechanically taken over in the form of droplets or mist with the air leaving the first absorption device and in order to eliminate the liquid droplets of the cresol there can be and is preferably employed with the Brégeat system a mechanical cresol separator 5. This separator, however, does not eliminate the cresol vaporized into the gaseous medium. If the air or gaseous mixture is passed through the cresol separator the statement that the gaseous mixture contains about 0.7 gram of cresol at 20 degrees C. applies. In general, however, to be on the safe side as to an estimate of the amount of cresol in the vapor mixture, it is customary to figure there is 0.8 gram cresol per cubic meter of gaseous mixture. The present invention accordingly embraces the recovery first of the droplets or mist of the cresol and then the recovery of the 0.8 gram of cresol vapors per cubic meter of outgoing air.

Instead of using the separator 5, a mechanical separator may be provided in the column itself, as by filling the upper tray of the column 2 with a deep mass of wire coils "W," say to the roof as indicated in Figure 1. By sufficiently extending the height of the column and interposing therein sufficient wire coils it would be feasible to thereby practically eliminate all the cresol mist or droplets.

Thus the present invention embraces the mechanical separation of the cresol mist or droplets from the air after leaving the first absorption device, as specified in the Brégeat Patents herein identified and the subsequent recovery of phenol vapors (cresol vapors) from said air by second absorption device wherein there is employed a suitable vegetable oil or other suitable liquid absorbent. In place of the particular absorption column 9 indicated, any other absorption device may be used. This process can be continued or repeated until the oil or other absorption liquid becomes saturated or has absorbed the desired amount of cresol, and thereafter if desired the absorption liquid may be treated to recover the cresol therefrom, or the absorption medium may be otherwise disposed of with the cresol content therein.

The vegetable oils especially suitable for employment are among those classified chemically as more or less unsaturated oils. Some of the oils in this class may be specified as linseed oil, rapeseed oil, peanut oil and cotton seed oil. Linseed oil, is less suitable, as it is liable to oxidize and thicken. Peanut oil has proved satisfactory in actual industrial practice, likewise rapeseed or cotton seed oil.

The several cresols have boiling points between 190 degrees C. and 202 degrees C. Phenol has a boiling point of 182.6 degrees C., while the several xylenols have boiling points between 211.5 degrees C. and 219.5 degrees C., as expressed by several authorities.

After the particular vegetable oil employed has absorbed the phenols (e. g., cresol) of lapping up or absorbing the cresol oil can then be subjected to a stripping operation which may be carried out as by allowing live steam to bubble into the oil heated at 120 degrees C., and this physical chemical phenomenon follows even though the boiling points of the phenolic absorbents—cresols, phenol, and xylenols—are higher than the 120 degrees indicated. This allows the ultimate recovery of the cresol and the subsequent reemployment of the vegetable oils and the cresols.

It will be noted that the present invention is not limited to the employment of a vegetable oil as an absorbing agent for the cresol vapors since any other suitable liquid absorbent may be employed as an absorbing agent in attaining the desired end.

It will also be noted that an intermittent or continuous process may be employed for the recovery of the phenols (including cresols, etc.). It will also be manifest that the process may be conducted in various ways without departing from the spirit and scope of the invention.

It is to be understood that the terms "air" and "gaseous medium" are above employed in a generic sense, and that where "air" is referred to, any gaseous medium which is inert with respect to the vapors present, may be employed.

It will be obvious that the invention is not restricted to the use of the particular mechanical separator illustrated in detail in Figs. 2 and 3, but that any type of mechanical separator can be employed, between the place where the gaseous medium leaves the phenolic absorbing liquid in absorber 1 and the place where the said gaseous medium comes into contact with the absorbing liquid in the absorber 9.

What I claim is:—

1. In the recovery of the vapors of volatile solvents from a gaseous medium by the employment of cresol as an agent for absorbing the vapors from such gaseous medium, the method which comprises passing the gaseous medium which has been subjected to the absorbing action of the cresol through a mechanical separator to separate droplets of cresol from the gaseous medium carrying the vapors of the cresol, and thereafter bringing the gaseous medium which contains cresol vapors, into intimate contact with an agent capable of absorbing the cresol vapors.

2. In the recovery of volatile solvents, the method which comprises subjecting a mixture containing gaseous medium and vapors of the volatile solvents to the action of a phenol, thereafter passing the gaseous medium through a mechanical separator for the removing of droplets of the phenol which may be carried in the air or gaseous medium, and subsequently subjecting the gaseous medium to the action of a second absorbent capable of removing the vapors of the phenol.

3. In an absorption system for the recovery of volatile solvents from a gaseous medium, in combination, an absorption device suitable for treating a mixture of the gaseous medium and vapors of volatile solvents with a phenolic absorbing agent, a mechanical separator for droplets and mist of phenols, piping for conducting the gaseous medium from said absorption device to the separator, a second absorption device, piping for conducting the gaseous medium from the separator to the second absorption device, and means for supplying to the second absorption device, a liquid absorbing agent different from that used in the first absorption device, whereby vapors of the phenolic absorbing agent reaching said second absorption device may be removed from the air or gaseous medium by the second absorption agent.

4. In the recovery of volatile solvents, the method which comprises subjecting a mixture of a gaseous medium, with the vapors of the volatile solvents therein, to the absorbing action of a liquid phenol, thereafter passing the gaseous medium through a mechanical separator for the mechanical removal of droplets of the phenolic absorbing agent which may be carried in the gaseous medium, and subsequently subjecting the gaseous medium to the action of a second absorbing agent capable of taking up vapors of the phenolic absorbing agent which may be entrained in the gaseous medium.

5. In an absorption system for the recovery of volatile solvents from a gaseous medium wherein there is employed an absorption column into which a mixture of the gaseous medium and vapors of the volatile solvents to be recovered is brought into intimate contact with a phenolic absorbing agent, which system comprises in combination, an absorber in which the current of gaseous vehicle is treated with an absorbing liquid, a separator for mechanically eliminating droplets of the absorbing agent from the gaseous medium, and a second absorption device through which the gaseous medium ultimately passes and separate, and independent means for supplying a liquid absorbing agent, different from that used in the first absorption device, to such second absorption device, for absorbing vapors of the absorption agent used in the first absorption device.

6. In the recovery of volatile solvents from a gas carrying the same in vaporized form, by passing such gas carrying the vaporized solvent through an absorption device in contact with an absorbing agent consisting essentially of a cresol; passing the gas after treatment thereof with the said absorbing agent through a mechanical separator capable of precipitating a large part at least of the mist or droplets of said liquid absorbing agent carried from said absorbing operation in said gas; and thereafter passing the said gas through another absorption device in which it is brought into intimate contact with an absorbing liquid capable of absorbing any cresol carried in vapor form in said gas.

7. In the recovery of volatile solvents from gases carrying the same in vaporized form, by passing such gases carrying the vaporized solvent through an absorption device in contact with an absorbing agent consisting essentially of a phenol, the improvement which comprises passing the gases coming from the said absorption device, through a mechanical separator for precipitating mist and droplets of phenol, and thereafter passing the said gas through a second absorption device in which it is brought into intimate contact with a second absorbing liquid capable of absorbing any phenol carried in vapor form in said gas.

8. An absorber in which gases can be washed with phenols, a mechanical separator for mist, and a second absorber, and connections for passing a current of gas through said three devices in the order stated and wholly separate means for supplying wholly different absorbing liquids to the two absorbers.

9. In the removal of vapors of volatile solvent from a gaseous vehicle carrying the same, the process which comprises causing the mixture of gaseous vehicle and solvent vapors to flow, first into intimate contact with a liquid phenolic absorbing agent, then causing the gaseous vehicle, while carrying entrained phenolic absorbent, to flow against solid surfaces while gradually causing a change in the direction of flow thereof, whereby any mist of phenolic absorbing agent in said gaseous vehicle is, in major part at least, precipitated, and thereafter bringing the gaseous vehicle into contact with a second absorbent agent capable of removing vapors of phenolic absorbent therefrom.

Specification signed this 16 day of Aug. A. D. 1921.

JEAN HENRY BRÉGEAT. [L. S.]